E. B. STEFFEY.
TIRE CHANGING TOOL.
APPLICATION FILED DEC. 1, 1919.
1,397,465.
Patented Nov. 15, 1921.
2 SHEETS—SHEET 2.
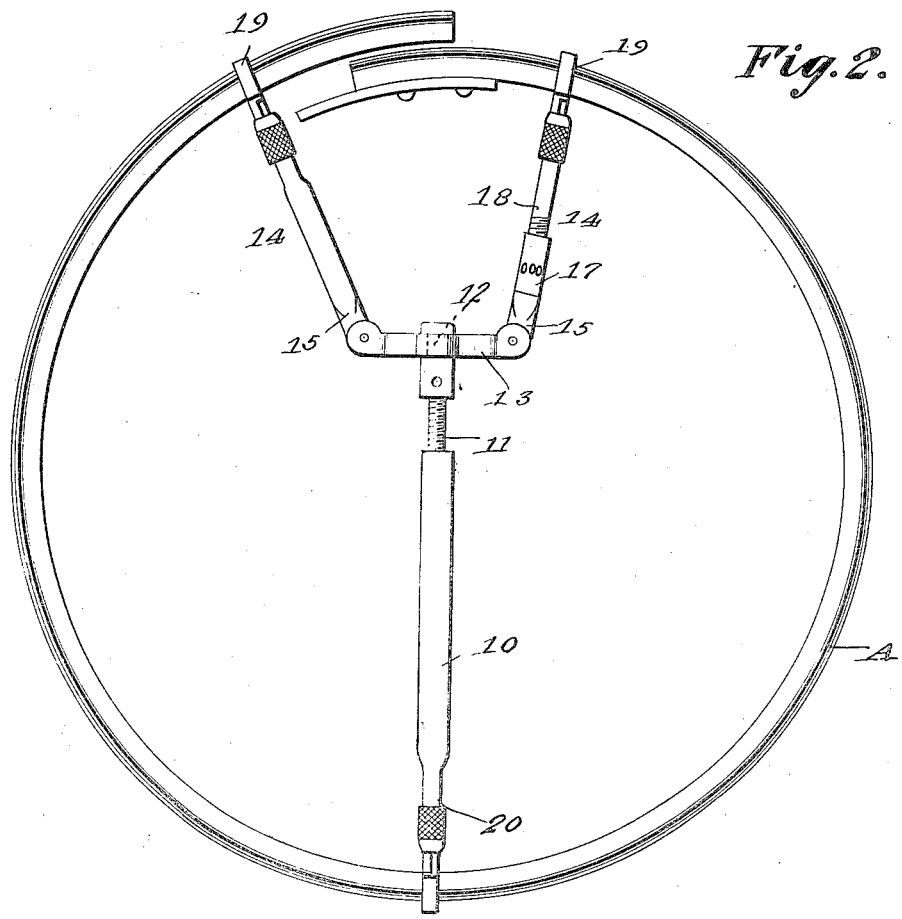
Fig. 2.
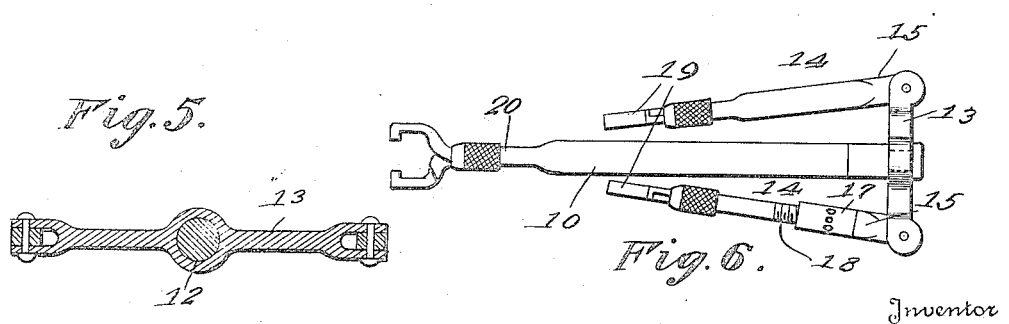
Fig. 5.
Fig. 6.
Witnesses
N. G. Thomas
Inventor
E. B. Steffey.
By Victor J. Evans
Attorney

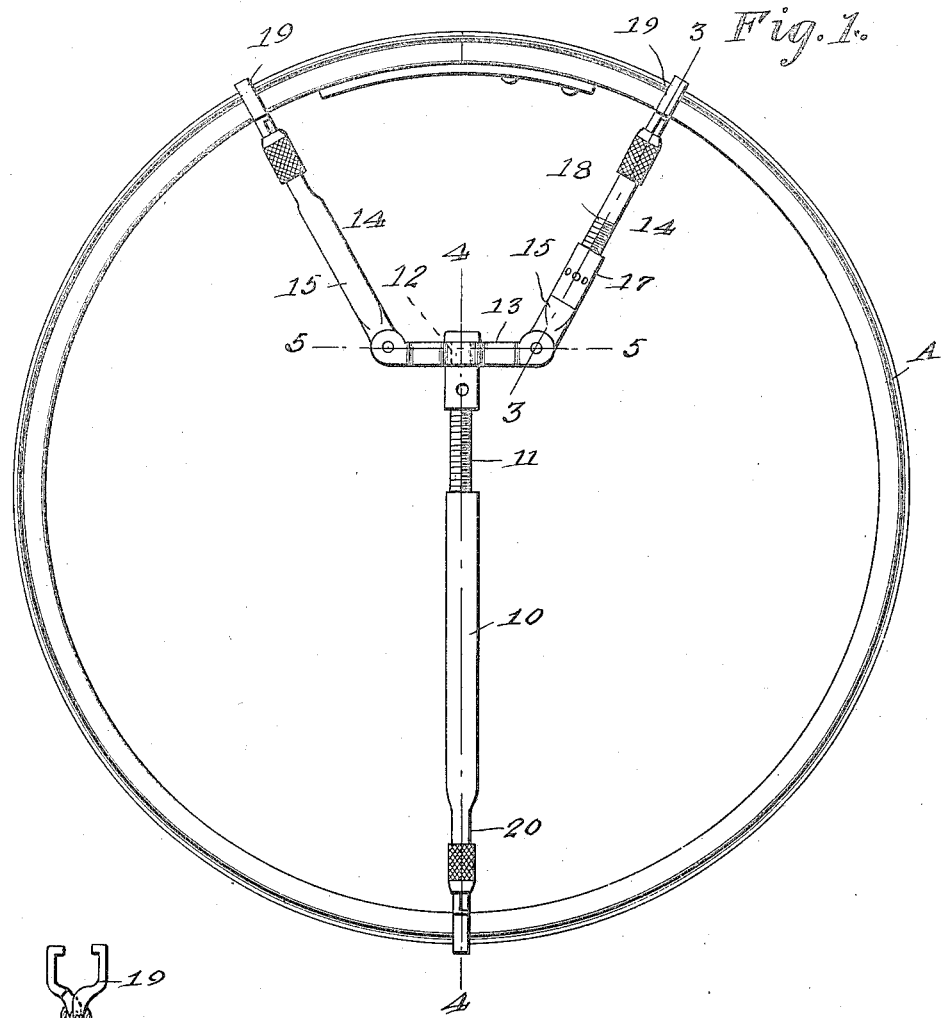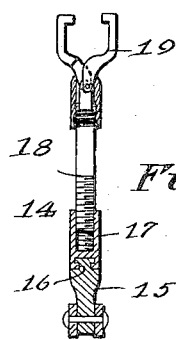

UNITED STATES PATENT OFFICE.

ERNEST B. STEFFEY, OF LAWRENCEVILLE, ILLINOIS.

TIRE-CHANGING TOOL.

1,397,465.   Specification of Letters Patent.   Patented Nov. 15, 1921.

Application filed December 1, 1919. Serial No. 341,573.

*To all whom it may concern:*

Be it known that I, ERNEST B. STEFFEY, a citizen of the United States, residing at Lawrenceville, in the county of Lawrence and State of Illinois, have invented new and useful Improvements in Tire-Changing Tools, of which the following is a specification.

This invention comprehends the provision of a tire changing tool, designed to be easily and quickly adjusted to accommodate itself to rims of different diameters and operable to contract and expand the rim as the occasion requires.

The nature and advantages of the invention will be better understood when the following detail description is taken in connection with the accompanying drawing, the invention residing in the construction, combination and arrangement of parts as claimed.

In the drawings forming part of this specification like numerals of reference indicate similar parts in the several views and wherein:—

Figure 1 is a plan view showing the tool associated with the rim.

Fig. 2 is a view showing the rim contracted and held in this condition by means of the tool.

Fig. 3 is a sectional view taken on line 3—3 of Fig. 1.

Fig. 4 is a sectional view taken on line 4—4 of Fig. 1.

Fig. 5 is a similar view taken on line 5—5 of Fig. 1.

Fig. 6 is a view of the device showing the same folded.

The device forming the subject matter of my invention comprises a hollow tubular member 10 having a threaded bore to accommodate the adjusting screw 11. The head of the adjusting screw is reduced as at 12 and has swivelly connected thereto the cross bar 13. Each of the extremities of the bar has pivoted thereto a clamping member 14 of the construction illustrated. Each clamping member comprises an arm 15 directly connected with the adjacent extremity of the bar 13, the arm 15 of one of the clamping members being reduced to provide a groove 16. The lower end of the sleeve 17 is fitted within the groove to provide for a swivel connection between the parts, while the sleeve is provided with an internal threaded bore to accommodate an adjusting screw 18. Adjustable clamping hooks 19 are pivotally associated with the screw 18 adjacent the upper end thereof. The tubular member 10 is also provided and has associated therewith a similar clamping arm indicated generally at 20.

In practice, the device is arranged within the rim A and the clamping hook 20 arranged to engage the rim at a point adjacent the ground. The sleeve 17 of the clamping member is then rotated to vary or adjust the length of the arm so that the clamping hooks 19 can be brought into effective engagement with the rim at spaced points. Subsequent to this adjustment, the screw 11 is rotated in a proper direction to contract and hold the rim contracted, thus facilitating the removal of the tire. After the tire has been repaired and replaced about the rim, the screw 11 is rotated in a reverse direction to expand the rim into proper position.

While I have shown and described what I consider the preferred embodiment of the invention, I desire to have it understood that I do not limit myself in this connection and that such changes may be resorted to when desired as fall within the scope of what is claimed.

What I claim is:—

A device of the class described comprising a tubular member provided with a threaded bore, an adjusting screw engaging said bore, adjustable clamping hooks pivotally secured to said tubular member, a cross bar swiveled upon the end of said screw, arms pivotally secured to opposite ends of said cross bar, adjustable clamping hooks pivotally secured to the end of one of said arms, a sleeve swiveled upon the end of the other arm and provided with a threaded bore, an adjusting screw engaging the bore in said sleeve, and adjustable clamping hooks pivotally secured to the end of the last mentioned adjusting screw.

In testimony whereof I affix my signature.

ERNEST B. STEFFEY.